United States Patent [19]
Cohen

[11] Patent Number: 4,696,029
[45] Date of Patent: Sep. 22, 1987

[54] TELEPHONE TRAFFIC LOAD CONTROL SYSTEM

[75] Inventor: Fred Cohen, Philadelphia, Pa.

[73] Assignee: Telesciences, Inc., Mount Laurel, N.J.

[21] Appl. No.: 808,249

[22] Filed: Dec. 12, 1985

[51] Int. Cl.$^4$ .......................................... H04M 11/00
[52] U.S. Cl. ........................................ 379/92; 379/93; 379/112; 379/138; 358/85; 455/2
[58] Field of Search ............ 179/2 DP, 2 AS; 358/84, 358/85, 86; 455/2, 92, 93, 94, 112, 113

[56] References Cited

U.S. PATENT DOCUMENTS

| | | | |
|---|---|---|---|
| 4,107,735 | 8/1978 | Frohbach | 358/84 |
| 4,151,370 | 4/1979 | Root | 179/2 AS |
| 4,355,372 | 10/1982 | Johnson et al. | 364/900 |
| 4,451,700 | 5/1984 | Kempner et al. | 379/92 X |
| 4,546,382 | 10/1985 | McKenna et al. | 358/84 |
| 4,573,072 | 2/1986 | Freeman | 358/86 |
| 4,603,232 | 7/1986 | Kurland et al. | 179/2 AS |
| 4,630,108 | 12/1986 | Gomersall | 358/84 |

OTHER PUBLICATIONS

PCT application, WO 85/03830, AT&T, "Method and Apparatus for Subscription Broadcast", 8/29/85.

Yankee Group, "Telco Pay-Per-View System", Report No. 83-1, 6/83.

*Primary Examiner*—Gene Z. Rubinson
*Assistant Examiner*—M. Connors
*Attorney, Agent, or Firm*—Walter B. Udell

[57] ABSTRACT

A system for controlling the initiation of voting telephone calls by controlling character generators at a group of affiliated television broadcast stations through a control center which receives real-time feedback of telephone voting traffic data from polling terminals at telephone central offices and utilizes this information to regulate visual stimuli broadcast by the television station. The control center initiates polling traffic by causing associated character generators at the affiliate transmitter to produce the desired message displays across the TV screen. The control center monitors the polling call traffic at each central office until it determines that the traffic being generated has reached a level which is not within the traffic-handling capabilities of that particular central office switching machines. It then sends messages which cause the character generators at the local affiliate to reduce the frequency and/or duration of the message until the traffic generated has dropped to a level which is within the traffic handling capabilities of the central office, whereupon the frequency and/or duration is again increased.

17 Claims, 3 Drawing Figures

TELEPHONE TRAFFIC LOAD CONTROL SYSTEM

This invention relates generally to telephone mass polling systems, and more particularly relates to a system for operating a telephone mass polling system without impairment of normal telephone service.

Currently, telephone mass polling is accomplished through use of a national "900" number. The operation of the "900" network involves the use of dedicated trunks from each local switching machine, also known as a central office or CO or end office to a "900" terminating location situated in the western part of the United States. The number of trunks from each central office is small, so that the number of polling calls which can be completed through each central office is limited by the number of outgoing "900" trunks, and when "900" traffic is generated as the result of a polling event, the system capability is overloaded and it operates as a "choked network." Consequently, when a telephone subscriber attempts to vote in a polling event, a "busy" signal is frequently encountered. As a result, the subscriber makes multiple attempts to complete the call, and the amount of traffic generated is multiplied by a significant factor.

The central office switching machine has limited capacity. It is designed to provide dial tone and associated services to its subscribers during a busy hour which produces traffic in accordance with statistically established traffic forecasts. A telephone polling event, however, can generate traffic loads far in excess of normal busy-hour expectations. When a controversial issue of wide interest is offered to a large television audience, the appearance of a "900" voting number can trigger traffic loads which are orders of magnitude beyond the capabilities of the central office switching machines. The result of such offered traffic is to create a condition where subscribers are unable to obtain dial tone. Thus, vital calls, such as request for emergency services, can be denied during the periods of congestion.

In an effort to improve this situation, a mass polling terminal known as B9N has been developed and marketed by the assignee of the instant invention which offers significant improvement in that it allows voting calls to be terminated at local switching machines, thus eliminating the throttling effect of the "900" dedicated trunks. However, even with the B9N terminals, traffic is limited by the basic switching capacity of the central office. Thus, a polling event with high response can still deny service to emergency calls.

In view of these serious problems, it is highly desirable that the generation of mass polling traffic be regulated so as to be maintained within the capabilities of the central office switching machines. The system according to the invention provides this capability by controlling the initiation of voting calls through regulation of the visual stimuli which trigger the calls.

The conduct of a telephone polling event involves the use of written voting instructions which are placed within the TV viewer's field of vision by one of the following methods:

Studio display arrangements,
Picture overwrite by character generator at the studio,
Picture overwrite by character generator at the local broadcast stations.

The system according to the invention regulates visual stimuli by eliminating studio displays and establishing control of character generators at affiliated broadcast stations through a control center. This control center receives real-time feedback of traffic data from polling terminals and utilizes this information to regulate visual stimuli.

In operation, the control center initiates polling traffic by causing associated character generators at the affiliate transmitter to produce the desired message displays across the TV screen. The control center monitors the polling call traffic at each central office until it determines that the traffice being generated has reached a level which is not within the traffic-handling capabilities of the central office switching machines. It then sends messages which cause the character generators at the local affiliate to reduce the frequency and/or duration of the message until the traffic generated has dropped to a level which is within the traffic handling capabilities of the central office. Thus, continuing control of voting traffic is maintained through real-time feedback.

It is a primary object of the invention to provide a novel telephone traffic load control system for telephone mass polling events which adjusts the frequency and/or duration of broadcast of a polling message as a means for regulating the frequency of response thereto.

Another object of the invention is to provide a novel telephone traffic load control system as aforesaid which utilizes a polling terminal at the telephone central office to accumulate polling data and report when interrogated to thereby prevent overload of the "900" line system.

A further object of the invention is to provide a novel telephone traffic load control system as aforesaid which is effective under a condition of detected maintained overload to suspend transmission of the polling message until a condition of non-overload is again established at the affected central office.

The foregoing and other objects of the invention will be clear from a reading of the specification in conjunction with an examination of the appended drawings, wherein.

Figure 1:
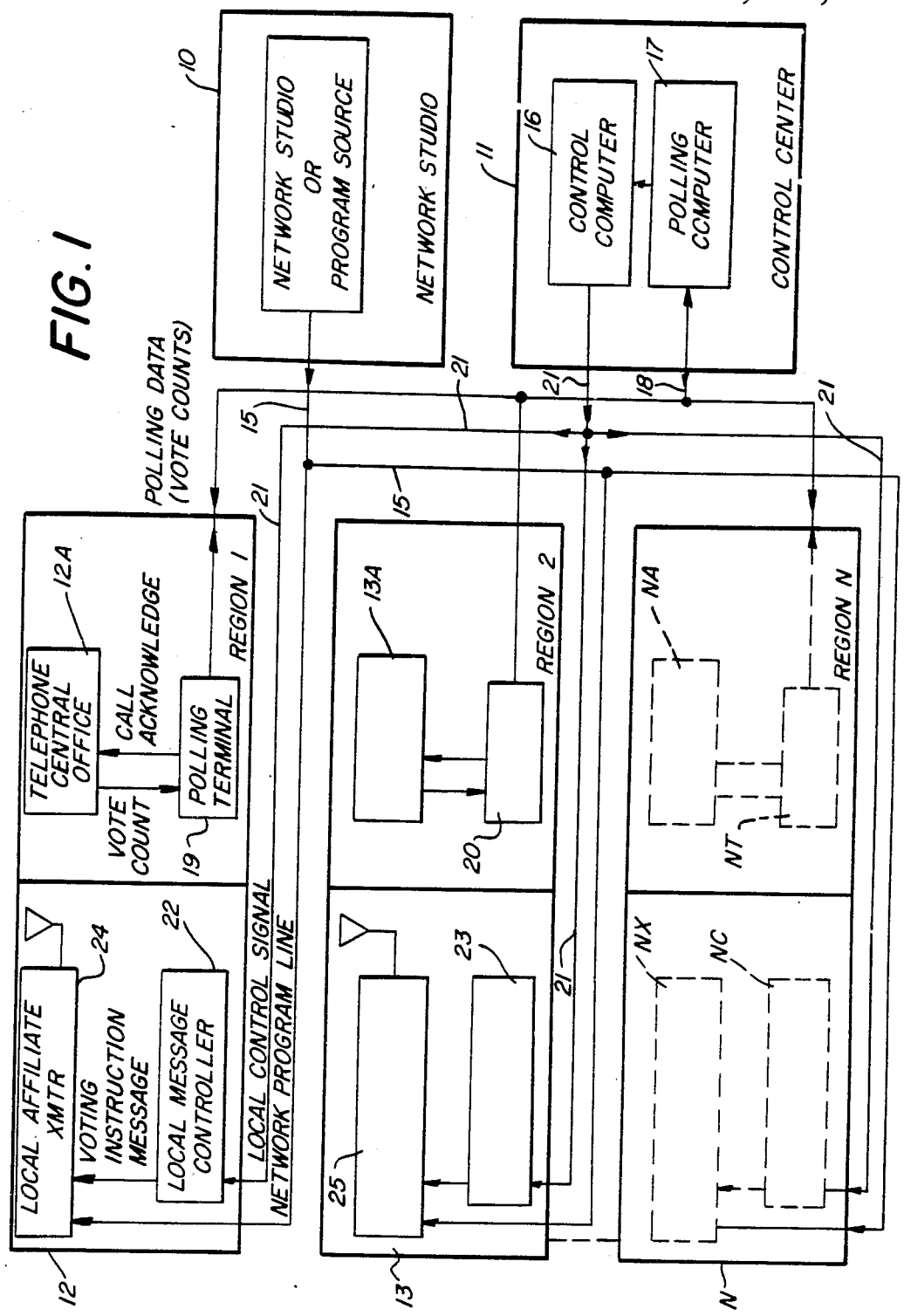
FIG. 1 is a functional block diagram of the novel telephone traffic control system according to the invention.

FIG. 1 illustrates the system according to the invention in which there is seen a network studio 10, control center 11, and a group of regional local affiliate television stations designated generally as 12, 13 and N, and having associated telephone central offices 12A, 13A and NA. The network programming is directed from the network studio 10 to the affiliates over the network program line 15. The control center 11 includes a polling computer 17 and a control computer 16, each of which could be a Hewlett-Packard HP A900 computer. The polling computer 17 is connected by polling line 18 to polling terminals 19, 20 and NT located respectively at the telephone central offices 12A, 13A and NA. The control computer 16 is connected by control line 21 to the local message controllers 22, 23 and NC, which are in turn connected respectively to television transmitters 24, 25 and NX.

Each telephone company central office in the system network, such as 12A and so forth, utilizes a polling terminal such as 19 to collect and count votes from the general public, occurring as a result of prompting messages transmitted by local television stations such as 12, 13 and N. The television stations either generate the messages locally as at 22, 23 and NC, or receive it from their network center. In either case, the display of the messages is under the control of a local message controller.

Each polling terminal 19, 20, NT has a dual function. It compiles the results of the voting and monitors the frequency of the calls to the central office where it is located. The terminal determines during each message cycle if all its inputs are fully occupied by incoming calls. Message cycles can typically occur approximately once every ten seconds so that the terminal samples the call rate 360 times per hour. If all inputs to the terminal are busy through "P" consecutive cycles, where "P" is a variable, to be determined by the telephone companies, it is an indication of a very high number of callers responding to the polling messages. In such a case the terminal stores a "BUSY" alarm message for the polling computer 17 to which it is connected. The polling computer 17 cyclically interrogates the reporting terminal and notifies the control computer 16 about the busy condition of the particular region.

The control computer 16, which controls the local message controllers, takes appropriate action to reduce the rate of, or terminate the generation of, more messages for the region with a "BUSY" condition. When the polling terminal 19, 20 or NT senses that the traffic is again within normal limits, it sends a "NON-BUSY" message to the polling computer 17 which conveys the message to the control computer 16. At that time maximum rate polling messages will again be allowed by the control computer 16. This closed-loop system thereby maintains the desired load level at each regional central office.

Figure 2:
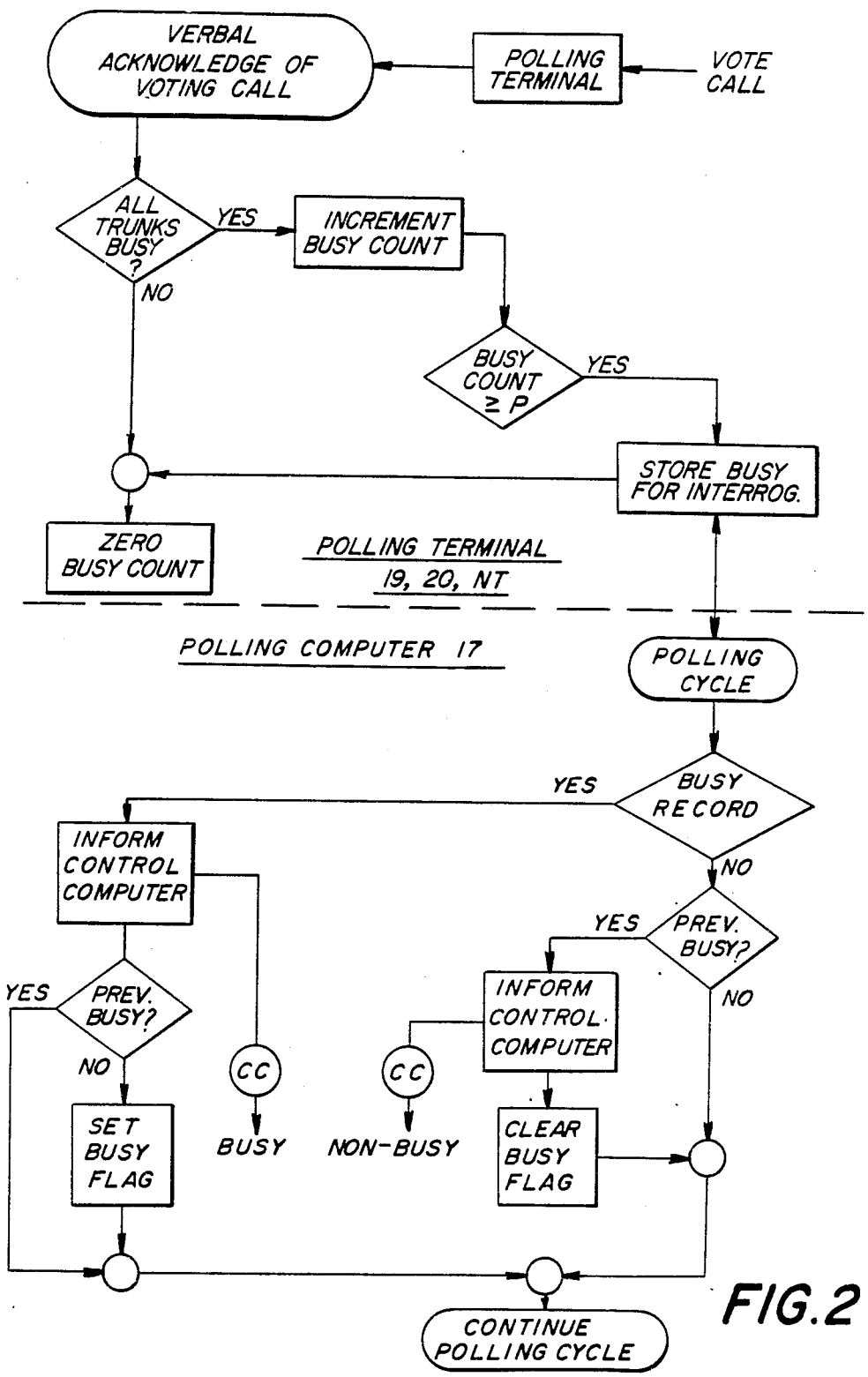
FIGS. 2 and 3 illustrate a program for operation of the system in a closed loop real-time feedback system.
Figure 3:
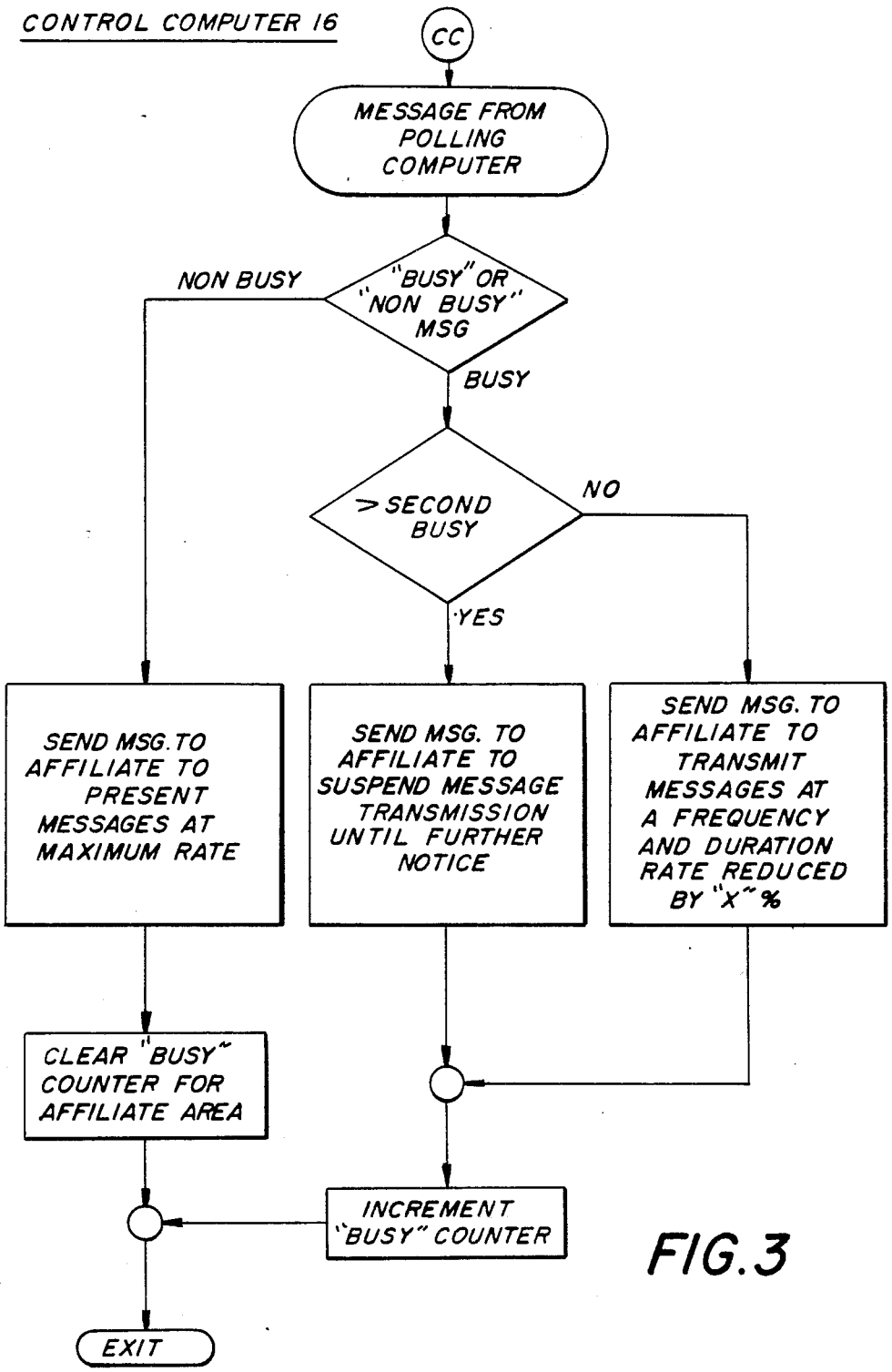

The programming by means of which the control computer 16, polling computer 17, polling terminals 19, 20, NT and local message controllers 22, 23, NC are interactively connected is shown in FIGS. 2 and 3 to which attention should be now directed. FIG. 2 is separated into two sections by a dash line, the polling terminal portion being above the dash line and the polling computer portion being below the dash line. The control computer 16 portion is shown in FIG. 3.

Considering first FIG. 2, assume that a voting message for some issue has been flashed on the television screens in a given area by the local affiliate transmitter and that persons now start to call in to register their votes on the issue. At the top of FIG. 2 the vote call is indicated as coming into the polling terminal which then records the vote and verbally acknowledges to the caller that the vote has been received. The polling terminal determines whether all of the outgoing trunks are busy, and acts in accordance with such information. If all of the outgoing trunks are not busy, then the busy-count which is in the terminal is zero and nothing further occurs, the polling terminal awaiting the next vote call.

If on the other hand the response to the question of whether all trunks are busy is a "yes", then the busy call register is incremented and the busy-count is examined to determine whether or not it is greater than or equal to a particularly preselected count "P", this selection of the count "P" being made by the telephone company. If the busy-count is not greater than or equal to "P", nothing further happens. On the other hand if the busy-count is greater than or equal to the count "P", that information is stored in anticipation of an interrogation from the polling computer 17. The busy-count register is at that time also zeroed. The polling terminal then goes about its business doing the same kind of operation over and over and awaits being polled by the polling computer 17.

The polling computer 17 polls the polling terminals at a group of telephone central offices on a sequential basis, the interval between pollings of the same polling terminal being chosen for a particular circumstance, such as how often it is desired to observe the occurrence of an overload. Assuming that the polling computer 17 now polls the polling terminal, it examines the message which is stored at the polling terminal with regard to busy condition and if there is a busy message in the polling terminal store, it clears that message out. If when the polling terminal was polled by polling computer 17 it was determined that there was not a busy signal in the polling terminal storage, then the busy record as shown in FIG. 2 is "NO" and it is then determined whether or not there was a previous busy signal. If there was no previous busy signal nothing further happens with regard to that terminal and it is continued on in the polling cycle.

If however, the present poll shows that there is no busy signal but the previous poll shows that there had been a busy signal, then the control computer is sent a "non-busy" message with regard to the particular polling terminal that has just been interrogated, and the busy flag is cleared. This non-busy signal will be treated in connection with FIG. 3 subsequently. However, the receipt of a busy signal must still be a considered with regard to FIG. 2.

If the polling of the polling terminal by the polling computer during its polling cycle determines that there is a busy signal stored there then this information is sent to the control computer as a busy signal. At the same time it is determined whether or not there was a previous busy signal. If there was not, then the busy flag of the polling computer 17 is set. If there was a previous busy signal then the busy flag is not set and the polling cycle is continued. At this point the polling computer 17 has determined whether particular polling terminal is showing non-busy or busy.

Consider now FIG. 3 which illustrates the operation of the control computer 17 which has just received a message from the polling computer with regard to a particular polling terminal. If the message which it receives is a non-busy signal then it sends a message over the control line 21 to the particular affiliate associated with that particular polling terminal such that the local message controller delivers the message at a maximum rate. The busy counter is cleared for that particular affiliate area and the program exits. If on the other hand a busy signal was what was received from the polling computer 17 then it is necessary to determine whether this is the first or second busy signal received, or if in fact it is the third busy signal.

As shown, if it is the first or second busy signal then a message is sent back to the local message controller at the affiliate to transmit the messages at a frequency and duration rate reduced by a predetermined decided upon percentage, the busy-counter is incremented and the program exits. If on the other hand the busy-counter indicates that the busy signal is not the first or second busy signal, and hence is at least the third busy signal, a message is sent to the affiliate to suspend message transmission until further notice, because it is clear that a continuing busy condition is in existence at that affiliate. The busy-counter is again incremented and the program exits. This sequence is carried out for every single polling terminal in the system on a continuously repetitive basis, as for example the polling of each polling terminal at least every two minutes.

From the foregoing it is seen that through the mechanism of the polling terminals at each central office and a polling computer and control computer, the telephone traffic in each specific region can be closely monitored and controlled. This is accomplished by controlling the delivery of the voting instruction message over the television channel with respect to its frequency of delivery and the length of time during which the message remains visible to the viewing audience.

Having now described the invention in connection with a particular embodiment thereof, is will be appreciated that variations and modifications of the invention may now naturally occur to those persons normally skilled in the art without departing from the essential scope or spirit of the invention, and accordingly it is intended to claim the same broadly as well as specifically as indicated by the appended claims.

What is claimed as new and useful is:

1. A system for controlling the initiation of telephone calls responsive to a message broadcast by a broadcast station having a transmitter by controlling message generators at the broadcast station through a control center which receives real-time feedback of telephone traffic data from polling terminals at telephone central offices and utilizes this information to regulate stimuli broadcast by the station, comprising in combination,
   (a) message generator means operatively coupled to the broadcast station signal transmitter and effective responsive to control means to cause a specific message to be broadcast,
   (b) at least one polling terminal connected to a telephone system central office and operative to receive incoming calls on a plurality of discrete telephone lines, said terminal including means for recording the number of calls received on said plurality of telephone lines and means for recording and storing each instance when all of such plurality of telephone lines are in a "busy" condition,
   (c) polling means for interrogating said at least one polling terminal to determine the "busy" condition thereof,
   (d) control means operatively coupled to said message generator means and to said polling means and receiving information from the latter regarding the "busy" condition of said at least on polling terminal, said control means including decision making means responsive to the said information received from said polling means effective to control the rate or duration of the message caused to be broadcast by said message generator means, whereby, the rate of initiation of telephone calls responsive to the broadcaast message may be regulated.

2. A system as set forth in claim 1 wherein said message generator means and said at least one polling terminal are plural, wherein particular ones of said polling termials receive calls responsive to the message broadcast by the particular ones of said message generators associated therewith, and wherein said polling means interrogates each of said polling terminals.

3. A system as set forth in claim 1 wherein said message generator means and said at least one polling terminal are plural, wherein particular ones of said polling terminals receive calls responsive to the message broadcast by the particular ones of said message generators associated therewith, and wherein said polling means interrogates each of said polling terminals on a repetitively cyclic basis and controls the rate or duration of the message caused to be broadcast by the particular one of said message generators associated with the particular polling terminal polled.

4. A system as set forth in claim 1 wherein the broadcast station is a television station and the said message generator means causes a visual message to be transmitted for display on television receiver screens.

5. A system as set forth in claim 1 wherein said at least one polling terminal further includes means for storing the occurrence of a "busy" condition which exceeds a predetermined number.

6. A system as set forth in claim 1 wherein said at least one polling terminal further includes means for storing the occurrence of a "busy" condition which exceeds a predetermined number, and wherein said polling means interrogates said polling terminal to determine whether or not said predetermined number has occurred.

7. A system as set forth in claim 1 wherein said polling means includes further means effective to determine whether the polled terminal indicated a "busy" condition at the immediately preceding interrogation.

8. A system as set forth in claim 1 wherein said decision making means is responsive to a first kind of information received from said polling means to cause said message generator means to broadcast its message at a first rate.

9. A system as set forth in claim 1 wherein said decision making means is responsive to a second kind of information received from said polling means to cause said message generator means to broadcast its message at a second rate.

10. A system as set forth in claim 1 wherein said decision making means is responsive to cumulative information received from said polling means to cause said message generator means to terminate its message.

11. A system for controlling the initiation of telephone calls responsive to messages broadcast by broadcast stations transmitters by controlling message generators at a plurality of television broadcast stations through a control center which receives real-time feedback of telephone traffic data from polling terminals at telephone central offices and utilizes this information to regulate visual stimuli broadcast by the television station, comprising in combination,
   (a) a plurality of message generator means operatively coupled to the broadcast station signal transmitter respectively at a plurality of television broadcast stations and effective responsive to control means to cause specific messages to be broadcast,
   (b) a plurality of polling terminals connected respectively to a plurality of telephone systems central offices and operative to receive incoming calls on a plurality of discrete telephone lines, said terminals each including means for recording the number of calls received on said plurality of telephone lines and means for recording and storing each instance when all of said plurality of telephone lines are in a "busy" condition,
   (c) polling means for cyclically interrogating said plurality of polling terminals to determine the "busy" condition thereof,
   (d) control means operatively coupled to said plurality of message generator means and to said polling means and receiving information from the latter regarding the "busy" condition of said plurality of polling terminals, said control means including decision making means responsive to the said information received from said polling means effective to control the rate or duration of the messages caused to be broadcast by said message generator means, whereby, the rate of initiation of telephone calls responsive to the broadcast message may be regulated.

12. A system as set forth in claim 11 wherein each of said plurality of polling terminals further includes means for storing the occurrence of a "busy" condition which exceeds a predetermined number.

13. A system as set forth in claim 11 wherein each of said plurality of polling terminals further includes means for storing the occurrence of a "busy" condition which exceeds a predetermined number, and wherein said polling means interrogates each of said polling terminals to determine whether or not said predetermined number has occurred.

14. A system as set forth in claim 11 wherein said polling means includes further means effective to determine whether the polled terminal indicated a "busy" condition at the immediately preceding interrogation.

15. A system as set forth in claim 11 wherein said decision making means is responsive to a first kind of information received from said polling means to cause said message generator means to broadcast its message at a first rate.

16. A system as set forth in claim 11 wherein said decision making means is responsive to a second kind of information received from said polling means to cause said message generator means to broadcast its message at a second rate.

17. A system as set forth in claim 11 wherein said decision making means is responsive to cumulative information received from said polling means to cause said message generator means to terminate its message.

* * * * *